(12) United States Patent
Durieux

(10) Patent No.: US 6,405,118 B2
(45) Date of Patent: *Jun. 11, 2002

(54) SYSTEM FOR CHARACTERIZING A COMPUTER TO CONTROL A WHEEL ANTI-LOCK DEVICE FOR A MOTOR VEHICLE

(75) Inventor: Jean-Marc Durieux, Montbeliard (FR)

(73) Assignees: Automobiles Peugeot, Paris; Automobiles Citroen, Neuilly sur Seine, both of (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,284

(22) Filed: Apr. 17, 1998

(30) Foreign Application Priority Data

Apr. 17, 1997 (FR) ............................................ 97 04776

(51) Int. Cl.⁷ ................................................ G06F 7/00
(52) U.S. Cl. .............................. 701/71; 701/29; 701/32; 701/36; 701/35; 701/66; 340/459; 340/931; 702/113; 702/188
(58) Field of Search ............................ 701/29, 32, 115, 701/35, 36, 30, 66, 33; 364/424, 424.04; 340/825.31, 439, 459, 931; 702/123, 108, 113, 188

(56) References Cited

U.S. PATENT DOCUMENTS

| | | | | |
|---|---|---|---|---|
| 5,313,388 A | * | 5/1994 | Cortis | 364/424.04 |
| 5,491,631 A | * | 2/1996 | Shirane et al. | 364/424.04 |
| 5,907,287 A | * | 5/1999 | Sakagami et al. | 340/825.31 |
| 5,987,394 A | * | 11/1999 | Takakura et al. | 702/123 |
| 6,006,146 A | * | 12/1999 | Usui et al. | 701/29 |

OTHER PUBLICATIONS

Patent Abstracts of Japan, vol. 096 No. 012, Dec. 26, 1996 & JP 08 198087 A (Mazda Motor Corp.), Aug. 6, 1996.

* cited by examiner

Primary Examiner—William A. Cuchlinski, Jr.
Assistant Examiner—Tuan C To
(74) Attorney, Agent, or Firm—Burns, Doane, Swecker & Mathis, L.L.P.

(57) ABSTRACT

This system for characterizing a computer to control a wheel anti-lock device, incorporated in an onboard electronic system (1;) for a motor vehicle, using a remote coding device (6), the computer (2) comprising a data processing unit (4) associated with means (5) for storing said computer's operating data, is characterized in that a single logic device for controlling the wheel anti-lock device is loaded into the unit (4), in that the data storage means (5) include several sets of characteristic parameters (V1, V2, Vn) selectable for different vehicles, and in that the remote coding device (6) comprises means (7, 8) for recognizing the vehicle and means (7, 8) for characterizing the computer by associating with the logic device loaded in the unit, the set of parameters corresponding to the recognized vehicle.

13 Claims, 2 Drawing Sheets

SYSTEM FOR CHARACTERIZING A COMPUTER TO CONTROL A WHEEL ANTI-LOCK DEVICE FOR A MOTOR VEHICLE

This application claims priority under 35 U.S.C. §§119 and/or 365 to 97 04776 filed in France on Apr. 17, 1997; the entire content of which is hereby incorporated by reference.

The invention relates to a system for characterizing a computer to control a wheel anti-lock device, incorporated in an onboard electronic system for a motor vehicle.

Up until now, each version of the logic device for controlling the wheel anti-lock device had its own computer. In some cases several computers were required for the same type of vehicle according to its braking definition (drum or disc brakes, saloon or station wagon, for example).

This had the drawback of requiring the manufacture and management of several computers.

It is already known to have only one computer with a memory containing all the versions of the control logic device, associated with means for recognizing a part, for example the electric wiring system, of the vehicle, and choosing a version of the logic device according to the part recognized.

This has a similar drawback in that it requires the manufacture and management, not only of computers, but of vehicle parts, for example wiring systems.

The aim of the invention is therefore to resolve these problems.

For this purpose, the invention consists in a system for characterizing a computer to control a wheel anti-lock device, incorporated in an onboard electronic system for a motor vehicle, using a remote coding device, the wheel anti-lock computer comprising a data processing unit associated with means for storing the computer's operating data, characterized in that a single logic device for controlling the wheel anti-lock device is loaded into the data processing unit, in that the data storage means include several sets of characteristic parameters selectable for different vehicles, and in that the remote coding device comprises means for recognizing the vehicle and means for characterizing the wheel anti-lock computer by associating with the logic device loaded in the data processing unit of the computer, the set of characteristic parameters corresponding to the recognized vehicle.

The invention will be better understood with the help of the following description, given only by way of example, with reference to the appended drawings, in which:

FIG. 1 shows a system for characterizing a computer for controlling a wheel anti-lock device incorporated in an onboard electronic system for a motor vehicle.

Figure 1:
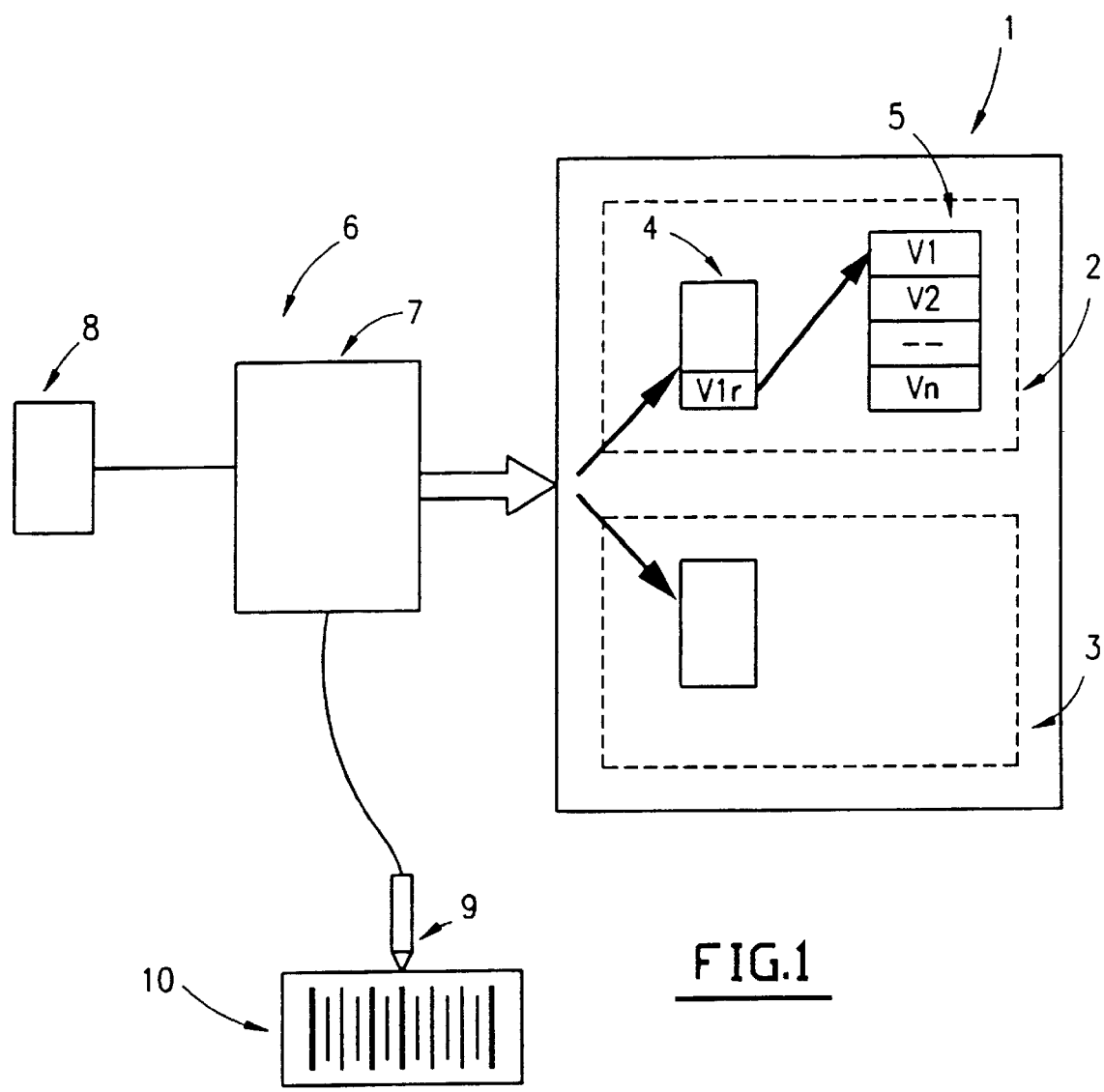
FIG. 1 is a block diagram illustrating the structure of a characterizing system in accordance with the invention.

This electronic system on board the vehicle is identified by the general reference 1 in this figure and comprises for example a wheel anti-lock computer identified by the general reference 2 and other computers one of which is identified by the general reference 3, for controlling other functions on board the vehicle.

Conventionally, the wheel anti-lock computer 2 comprises a data processing unit identified by the general reference 4 in this figure, associated with means for storing the operating data of the data processing unit, identified by the general reference 5.

To characterize this computer, in the system in accordance with the invention, a remote coding device is used identified by the general reference 6 in this figure, adapted to be connected to the electronic system of the vehicle, for example for receiving diagnostic information from the electronic system.

This remote coding device also comprises a data processing unit identified by the general reference 7 and associated with data storage means identified by the general reference 8.

In fact, in the system in accordance with the invention, a single logic device for controlling the wheel anti-lock device is loaded into the data processing unit 4 of the wheel anti-lock computer 2 and the corresponding data storage means identified by the general reference 5 include several sets of characteristic parameters selectable for different vehicles.

These sets of characteristic parameters are for example identified by references V1, V2 and Vn in this figure for vehicles of types 1, 2 and n for example.

The remote coding device 6 comprises means for recognizing the vehicle and means for characterizing the wheel anti-lock computer 2 of the vehicle, by associating with the logic device loaded into the data processing unit 4 of the vehicle, the set of characteristic parameters corresponding to the recognized vehicle.

These means for recognizing the vehicle and for characterizing the wheel anti-lock computer consist of the data processing unit 7 of this device, associated with data storage means 8.

In fact, the remote coding device 6 can comprise means for reading a vehicle identification bar code.

These reading means comprise for example an optical wand identified by the general reference 9 in this figure, adapted to read information in the form of a bar code identified by the general reference 10 in this figure, carried by the vehicle.

According to the information read from this code, the data processing unit 7 of the remote coding device 6 is adapted to recognize the vehicle for example by consulting a mapping table previously stored in the means 8 associated with said unit.

However, and as indicated hereinabove, the electronic system on board the vehicle can also comprise at least one other computer different from the wheel anti-lock computer 2, such as the computer identified by general reference 3 in this figure.

Said computer can be for example the vehicle's auxiliary equipment unit computer.

The remote coding device 6 can then also comprise means for identifying this other computer 3 to recognize the vehicle.

For this purpose, the data processing unit 7 of the remote coding device 6 can be adapted to exchange information with said other computer 3, to enable the vehicle to be recognized.

These means for exchanging information consisting for example of the data processing unit 7 of the remote coding device 6 comprise for example means for initiating the exchange to synchronize the transmission of information between the remote coding device 6 and the other computer 3, means of receiving an identification message sent by the other computer addressed to the remote coding device 6 and means for recognizing the vehicle from this identification message, the data processing unit 7 of the remote coding device then consulting for example a mapping table contained in the data storage means 8 associated with it.

According to the recognition of the vehicle, performed according to one and/or other of the previously described methods, the remote coding device 6 can load into the wheel anti-lock computer 2, and for example into the data processing unit 4 of the wheel anti-lock computer, a message containing at least one information item for locating the set of selectable parameters corresponding to the vehicle recognized, in the data storage means 5 associated with this data processing unit of this computer.

This message was previously stored in the storage means 8 of this device.

It can therefore for example be seen in this figure that this message is loaded into this data processing unit 4 by the remote coding device 6 and is identified by the reference V1r, which enables the data processing unit 4 and more particularly the logic device controlling the wheel anti-lock computer loaded into the data processing unit, to select the set of parameters V1 corresponding to a recognized vehicle V1, in order to activate the corresponding control law.

Of course the message loaded by the remote coding device 6 into this data processing unit 4 can also comprise other information such as for example the location at which the message is loaded in this unit.

In addition, a checking step can also be implemented by the processing unit 7 of the remote coding device 6 to check the state of characterization of the wheel anti-lock computer 2 in order to determine whether the computer has already been characterized or not.

Figure 2:
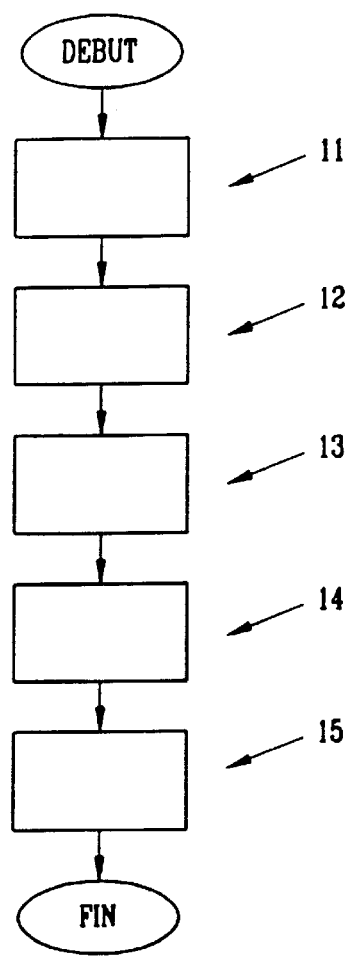
FIGS. 2, 3 and 4 are flowcharts illustrating the operation of such a system.
Figure 3:
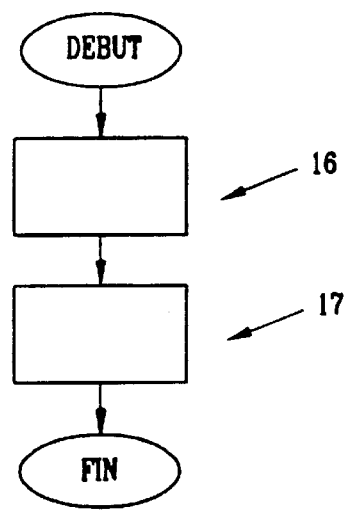
Figure 4:
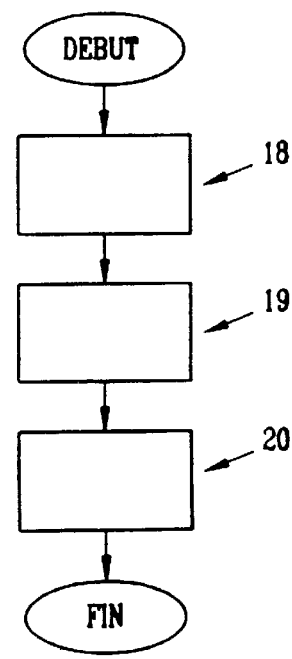

This operation is illustrated in FIGS. 2, 3 and 4.

It can be seen in FIG. 2 that the first step of this operation consists in a vehicle recognition step by the remote coding device, identified by the general reference 11 it this figure, which, when the vehicle has been recognized, enables the exchange of information to be initiated between the device and the wheel anti-lock computer in a step identified by the general reference 12.

During the step 13, the remote coding device verifies the characterization status of this computer, to enable, in step 14, the message containing the information for locating the set of selectable parameters corresponding to the vehicle recognized to be loaded into the computer.

When this message has been loaded into the wheel anti-lock computer, the wheel anti-lock computer sends the device, for example, an acknowledgement in a step identified by the general reference 15.

As indicated hereinabove, the recognition procedure can be provided by reading a bar code or by identifying a computer of the electronic system on board the vehicle, other than the wheel anti-lock computer.

FIG. 3 illustrates, at references 16 and 17 respectively, the step of reading the bar code on the vehicle and the step of recognizing the vehicle from this code, these steps being implemented by the remote coding device.

FIG. 4 shows another method for recognizing the vehicle by identifying one of its computers.

In this figure, step 18 represents initiation of the exchange of information between the remote coding device and the other computer 3, which enables this other computer to send in step 19 an identification message to the remote coding device 6, to enable this device to recognize the vehicle in step 20.

In the system in accordance with the invention, the wheel anti-lock computer comprises a data processing unit in which a single logic device is loaded, this data processing unit being associated with storage means for storing several sets of characteristic operating parameters corresponding to different vehicles.

The remote coding device is then adapted to recognize the vehicle for example by dialogue with another computer of the vehicle's electronic system, to load into the wheel anti-lock computer information for locating the set of parameters corresponding to the recognized vehicle in the data storage means of this computer, in order to characterize the wheel anti-lock computer according to the vehicle recognized.

This then enables these characterization operations to be simplified.

What is claimed is:

1. System for characterizing a computer to control a wheel anti-lock device, incorporated in an onboard electronic system for a motor vehicle, using a remote coding device, the wheel anti-lock computer comprising a data processing unit associated with means for storing the computer's operating data, characterized in that a single logic device for controlling the wheel anti-lock device is loaded into the data processing unit, in that the data storage means include several sets of characteristic parameters (V1, V2, Vn) selectable for different vehicles, and in that the remote coding device comprises means for recognizing the vehicle and means for characterizing the wheel anti-lock computer by associating with the logic device loaded in said data processing unit of the computer, the set of characteristic parameters corresponding to the recognized vehicle, further characterized in that this remote coding device also comprises means for reading a vehicle identification bar code.

2. System according to claim 1, characterized in that the means for characterizing the wheel anti-lock computer of the remote coding device comprise means for loading into this computer a message containing at least one information item (Vir) for locating the set of selectable parameters corresponding to the vehicle in the means for storing data associated with the data processing unit of this computer.

3. System according to claim 2, characterized in that the message loaded into the wheel anti-lock computer also comprises at least one information item concerning the location at which this message is loaded in this computer.

4. System according to claim 2, characterized in that the remote coding device also comprises means for monitoring the characterization status of the wheel anti-lock computer.

5. System according to claim 3, characterized in that the remote coding device also comprises means for monitoring the characterization status of the wheel anti-lock computer.

6. System according to claim 1, characterized in that the remote coding device also comprises means for monitoring the characterization status of the wheel anti-lock computer.

7. System according to claim 1, characterized in that the remote coding device also comprises means for monitoring the characterization status of the wheel anti-lock computer.

8. System for characterizing a computer to control a wheel anti-lock device, incorporated in an onboard electronic system for a motor vehicle using a remote coding device, the wheel anti-lock computer comprising a data processing unit associated with means for storing the computer's operating data, characterized in that a single logic device for controlling the wheel anti-lock device is loaded into the data processing unit, in that the data storage means include several sets of characteristic parameters (V1, V2, Vn) selectable for different vehicles, and in that the remote coding device comprises means for recognizing the vehicle and means for characterizing the wheel anti-lock computer by associating with the logic device loaded in said data processing unit of the computer, the set of characteristic parameters corresponding to the recognized vehicle, characterized in that this electronic system of the vehicle comprises at least one other computer different from the wheel anti-lock computer and in that the remote coding device also comprises means for identifying this other computer for recognizing the vehicle.

9. System according to claim 8, characterized in that the means for identifying this other computer comprises means for exchanging information with the other computer.

10. System according to claim 8, characterized in that the remote coding device also comprises means for monitoring the characterization status of the wheel anti-lock computer.

11. System according to claim 9, characterized in that the means for exchanging information include means for initiating an exchange of information between the remote coding device and the other computer, means for receiving an identification message sent by this other computer and means for recognizing the vehicle from this message.

12. System according to claim 9, characterized in that the remote coding device also comprises means for monitoring the characterization status of the wheel anti-lock computer.

13. System according to claim 11, characterized in that the remote coding device also comprises means for monitoring the characterization status of the wheel anti-lock computer.

* * * * *